United States Patent [19]
Vanderwerf

[11] Patent Number: 5,995,284
[45] Date of Patent: Nov. 30, 1999

[54] POLARIZED ILLUMINATION SYSTEM FOR LCD PROJECTOR

[75] Inventor: Dennis F. Vanderwerf, Austin, Tex.

[73] Assignee: 3M Innovative Properties Company, St. Paul, Minn.

[21] Appl. No.: 08/625,030

[22] Filed: Mar. 29, 1996

[51] Int. Cl.⁶ .............................. G02B 5/04; G02B 5/30; G02B 27/28
[52] U.S. Cl. ........................ 359/487; 359/495; 359/496; 359/619; 359/625; 359/627; 359/640; 359/834; 359/837
[58] Field of Search .................................... 359/487, 495, 359/496, 503, 599, 615, 834, 837, 618, 619, 625, 627, 639, 640

[56] References Cited

U.S. PATENT DOCUMENTS

| | | | |
|---|---|---|---|
| 3,743,380 | 7/1973 | Fugitt | 359/495 |
| 4,913,529 | 4/1990 | Goldenberg et al. | 350/337 |
| 4,969,730 | 11/1990 | van den Brant | 353/31 |
| 5,042,921 | 8/1991 | Sato et al. | 359/40 |
| 5,124,841 | 6/1992 | Oishi | 359/487 |
| 5,134,516 | 7/1992 | Lehureau et al. | 359/495 |
| 5,181,054 | 1/1993 | Nicolas et al. | 353/20 |
| 5,231,433 | 7/1993 | Yoshida et al. | 353/37 |
| 5,283,600 | 2/1994 | Imai | 359/495 |
| 5,359,455 | 10/1994 | Oishi | 359/487 |
| 5,381,278 | 1/1995 | Shingaki et al. | 359/256 |
| 5,428,469 | 6/1995 | Willett | 359/41 |
| 5,446,510 | 8/1995 | Mitsutake et al. | 353/20 |
| 5,504,544 | 4/1996 | Dreyer et al. | 353/38 |

FOREIGN PATENT DOCUMENTS

| | | | |
|---|---|---|---|
| 0 456 427 A2 | 11/1991 | European Pat. Off. | G02B 27/28 |
| 0 463 500 A1 | 1/1992 | European Pat. Off. | H04N 9/31 |
| 0 573 905 A1 | 12/1993 | European Pat. Off. | G02B 27/28 |
| 0 615 148 A2 | 9/1994 | European Pat. Off. | G02B 27/28 |
| 0152212 | 11/1981 | Germany | G02B 27/28 |
| 61-122626 | 6/1986 | Japan | G02B 27/28 |
| 7-199185 | 12/1993 | Japan . | |
| WO 93/25922 | 12/1993 | WIPO | G02B 5/28 |
| WO 96/05534 | 2/1996 | WIPO | G02B 27/28 |

OTHER PUBLICATIONS

Authors: M. Imai, H. Shiratori, Y. Tashiro, M. Sakamoto, and K. Kubota; Title: "A Novel Polarization Converter For High–Brightness Liquid Crystal Light Valve Projector" Aug. 31, 1993, Published in SID Conference Proceedings Brochure; pp. 257–260.

Authors: S. Shikama, E. Toide, and M. Kondo; Title: "A Polarization–Transforming Optics For A High–Luminance LCD Projector" Published in SID, vol. 32/4, 1991; pp. 301–304.

Author: E. Zehender; Title: "Headlights For Motor–Vehicles With Polarized Light," Nov. 22, 1972, "Lichttechnik." Reprint of 25 (#3), 100–103 (1973) Helios–Publ. Ltd., 1 Berlin 52, Borsigwalde; pp. 1–14.

Authors: M. Imai, M. Sakamoto, K. Kubota, Y. Kato, and N. Nishida Title: "High–Brightness Liquid Crystal Light Valve Projector Using A New Polarization Converter" SPIE vol. 1255 Large–Screen Projection Displays II (1990); pp. 52–58.

*Primary Examiner*—Ricky D. Shafer
*Attorney, Agent, or Firm*—Nestor F. Ho; Jack V. Musgrove

[57] ABSTRACT

An illumination system is described that efficiently produces linear polarized light for use in LCD projection. A polarizing beam splitter and half-wave retarder plate produce two adjacent collimated beams of light having a common polarization direction. These adjacent beams are spatially integrated into a single collimated polarized beam whose aspect ratio is subsequently converted to match that of the LCD format.

13 Claims, 11 Drawing Sheets

$\phi_1 = 30°$
$\phi_2 = 8°$
$\alpha_1 = 18.6°$
$\alpha_2 = 68°$
$\alpha_3 = 38.2°$
$A'/A = 2/3$
$nd = 1.523$

POLARIZED ILLUMINATION SYSTEM FOR LCD PROJECTOR

BACKGROUND OF THE INVENTION

1. Field of the Invention

The present invention generally relates to optical illumination systems, and more particularly to a polarized illumination system having a novel spatial integrator, including variations for controlling aspect ratio, the system being suited for use with electronic projection displays, particularly of the liquid crystal display type.

2. Description of the Prior Art

With the increasing use of liquid crystal display (LCD) devices in projection systems, there is a requirement for an efficient source of polarized light. Polarized light has been traditionally produced by an absorbing polarizer or a polarizing beam splitter (PBS) cube. For polarizing beam splitters, half of the light is reflected and this reflected polarized light is either thrown away, or converted to the same polarization as the transmitted beam. When converted, the reflected beam is then redirected to the LCD, along with the transmitted beam, to achieve a polarized light source that is brighter than one using a simple absorbing polarizer.

An early application of converting polarized light in illumination systems was for automotive headlamps, as described by Zehender in "Headlights for Motor-Vehicles with Polarized Light," *Lichttechnik*, pp. 100–103 (1973). In this early design, no attempt was made to achieve spatial recombination of the separate beams, or to control the beam cross-section. With the advent of LCD projection systems, this technology achieved renewed interest, for example as described by Imai et al., "A Novel Polarization Converter for High-Brightness Liquid Crystal Light Valve Projector," *SPIE Proceedings*, vol. 1225, pp. 52–58 (1990), and Shinsuke et al., "A Polarization-Transforming Optics for a High Luminance LCD Projector," *Proceedings of the SID*, vol. 32/4, pp. 301–304 (1991).

Figure 1:
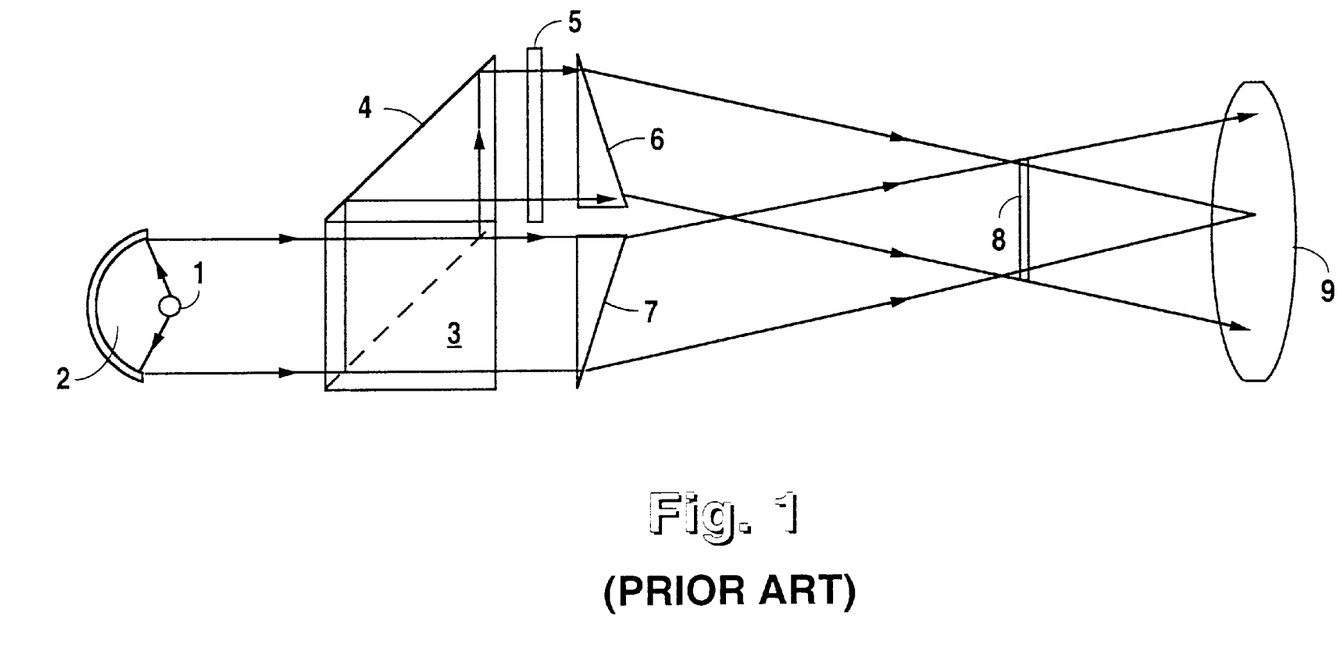
FIG. 1 is a diagram of a prior art polarizing illumination device using wedge prism beam integrators.

Japanese Patent Application (Kokai) No. 61-122626 describes a polarizing illumination device, that spatially integrates the separated beams at the LCD plane by means of a pair of wedge prisms. As shown in FIG. 1, the device uses a light source 1, collimator 2, PBS cube 3, right angle prism 4, half-wave retarder 5, wedge prisms 6 and 7, LCD panel 8, and projection lens 9. There must be a considerable distance between the wedge prisms and the LCD, since the beams are converging, and the incidence angle on the LCD must be kept small, which unduly restricts use of the device.

U.S. Pat. Nos. 4,913,529 and 4,969,730 describe converting polarized light projection illumination systems using polarizing plates or a PBS cube, combining the separated beams at the LCD with steering prisms. U.S. Pat. No. 5,381,278 uses converging and diverging lenses to redirect the separated beams to the LCD panel. Japanese Patent Application (Kokai) No. 71-99185 uses dual polarizing beam splitters, achieving a beam of oblong cross-section, but with no spatial recombination of the separate beams. European Patent Application No. 615,148 achieves polarization conversion and spatial recombination by recycling light backwards to the light source reflector, as does European Patent Application No. 573,905, assigned to Minnesota Mining and Manufacturing Co. (3M—assignee of the present invention). U.S. Pat. No. 5,181,054 achieves spatial recombination of the separated beams by sending the beams through the LCD in opposite directions, as does U.S. Pat. No. 5,428,469 (also assigned to 3M). U.S. Pat. No. 5,446,510 achieves a common collimation angle for the separate beams, but without any spatial integration.

U.S. Pat. Nos. 5,042,921 and 5,124,841 describe polarization converters with spatial integration achieved by refracting microprisms. The polarization converter described in European Patent Application No. 463,500 preserves the aspect ratio of the original beam, but requires the use of two LCD's, and European Patent Application No. 456,427 matches the beam size to the LCD panel by the use of back reflections from a lamp reflector having a rectangular exit aperture. The efficiency of these systems is limited by the complexity of the optics, quality of the reflectance coatings, degree of spatial recombination and beam shaping, and high chromatic dispersion of the refracting elements.

Spatial integration of the separate beams is important since the separated beams usually differ in intensity and color temperature. Collimation of the beam incident on the LCD is important, since most displays of this type work best with a common and low incidence angle of the illuminating light. Also, collimated light can be more efficiently focused by a field lens to the projection lens. Beam shaping is important to transmit maximum light through the rectangular aperture of the LCD. Lastly, compactness is desirable to reduce the size of the projector unit. None of the foregoing systems provides optimum performance in all of these areas.

SUMMARY OF THE INVENTION

The present invention provides a polarized illumination system particularly suited for an LCD projector, the system generally comprising a light source, means for collimating light from the source into an entrance beam, means for separating the entrance beam into a first beam having a first polarization state, and a second beam having a second polarization state, retarder means for converting said first beam from said first polarization state to said second polarization state, means for spatially integrating said first and second beams to create a collimated, exit beam having an aspect ratio, and means for changing the aspect ratio of said exit beam. The integrating means preferably comprises a spatial integrator cell having a first microprismatic element with a planar surface and a surface of prismatic grooves opposite said planar surface, and a second microprismatic element with another planar surface and another surface of prismatic grooves opposite the other planar surface and facing said surface of prismatic grooves on said first microprismatic element, there further being first and second, generally opposed reflecting surfaces adjacent first and second sides, respectively, of the second microprismatic element.

The means for separating the light may comprise a polarizing beam splitter (PBS) which creates the first and second beams, and the PBS may be adapted to direct the first and second beams to first and second reflectorized wedge prisms, respectively. In several embodiments, the spatial integrator cell has an exit element which is combined with a first beam compression element, and a second beam compression element is positioned adjacent the first beam compression element to achieve the changed aspect ratio. The first beam compression element may be a positive cylinder Fresnel lens, and the second beam compression element a negative cylinder lens. Alternatively, the first beam compression element may be a first microprismatic element, and the second beam compression element a second microprismatic element positioned at an oblique angle with respect to the first microprismatic element. The means for changing the aspect ratio of the exit beam may further be designed to additionally cause the exit beam to deviate by approximately 90°.

The current invention avoids many of the deficiencies of the prior art, by producing a converted secondary beam of collimated polarized light, and spatially recombining this beam with the primary beam using total internally reflective linear microprisms, preserving the polarization and collimation with minimal chromatic dispersion. The aspect ratio of the spatially integrated beam is then efficiently converted to match the format of an LCD panel. There is no requirement for any back-reflection or recycling of the beam in the direction of the light source, and the single collimated beam passing through the LCD panel can be more efficiently focused to the projection lens.

BRIEF DESCRIPTION OF THE DRAWINGS

The invention will best be understood by reference to the accompanying drawings, wherein.

DESCRIPTION OF THE PREFERRED EMBODIMENT

Figure 2:
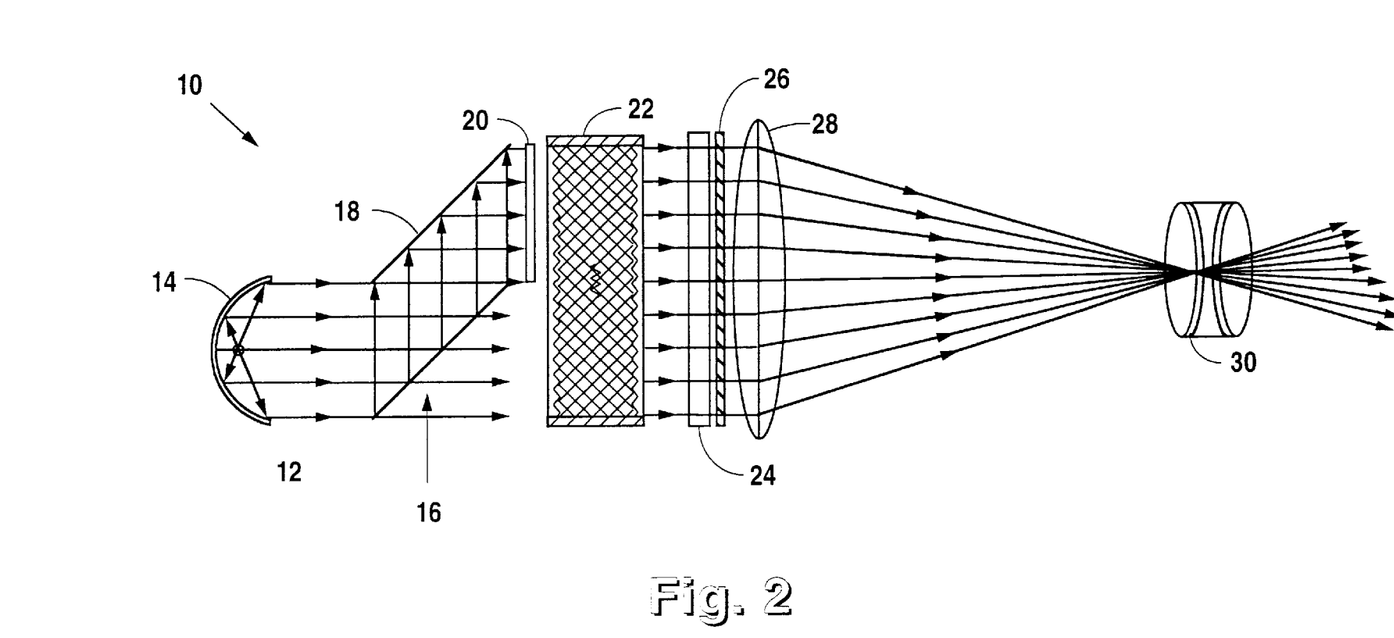
FIG. 2 is a diagram of one embodiment of the polarized illumination system of the current invention.

With reference now to the figures, and in particular with reference to FIG. 2, there is depicted one embodiment 10 of the polarized illumination system of the present invention. System 10 is particularly adapted for use with a liquid crystal display (LCD) projector, and the combination generally comprises a light source or lamp 12, a collimator or parabolic reflector 14, means 16 for separating p- and s-polarized light, taking the form of a polarizing beam splitter (PBS), mean 18 for redirecting one of the polarized beams (in this case, the reflected beam) parallel with the other polarized beam (the transmitted beam), taking the form of a right angle prism reflector, a half-wave retarder plate 20, a spatial integrator cell 22, an analyzer 26, an LCD panel 24, and a projection lens 28. Embodiment 10 is a single-panel, transmissive LCD projector, but those skilled in the art will appreciate that the general principle can be extended to color and pseudo-color transmissive LCD projectors using multiple panels, as well as reflective LCD light valve projectors.

Randomly polarized light from light source 12 is collimated by parabolic reflector 14 (or some other means) and enters PBS cube 16. The p-polarized light is transmitted and the reflected s-polarized light is turned 90° by light angle reflecting prism 18, where it is then converted to p-polarized light by half-wave ($\lambda/2$) retarder plate 20. The adjacent and spatially separated collimated light beams enter the microprismatic spatial integrator cell 22 where they are spatially integrated and exit as a single collimated polarized beam. Components 12–18 are individually known in the prior art and nearly any conventional components will suffice. Therefore, in embodiment 10, the primary novelty resides in spatial integrator 22.

Figure 3:
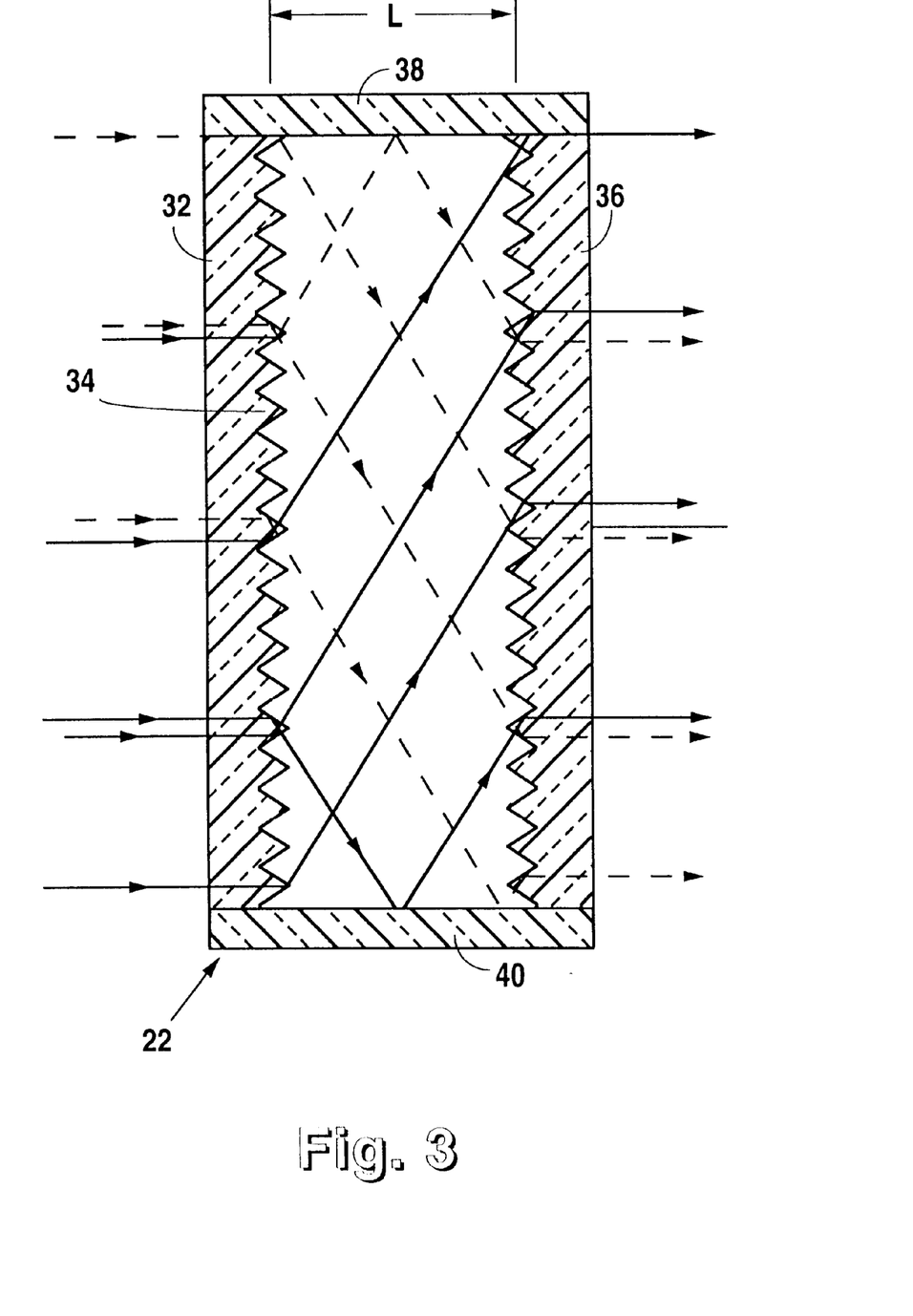
FIG. 3 is a diagram of one configuration of the spatial integrator cell used in the present invention.
Figure 3A:
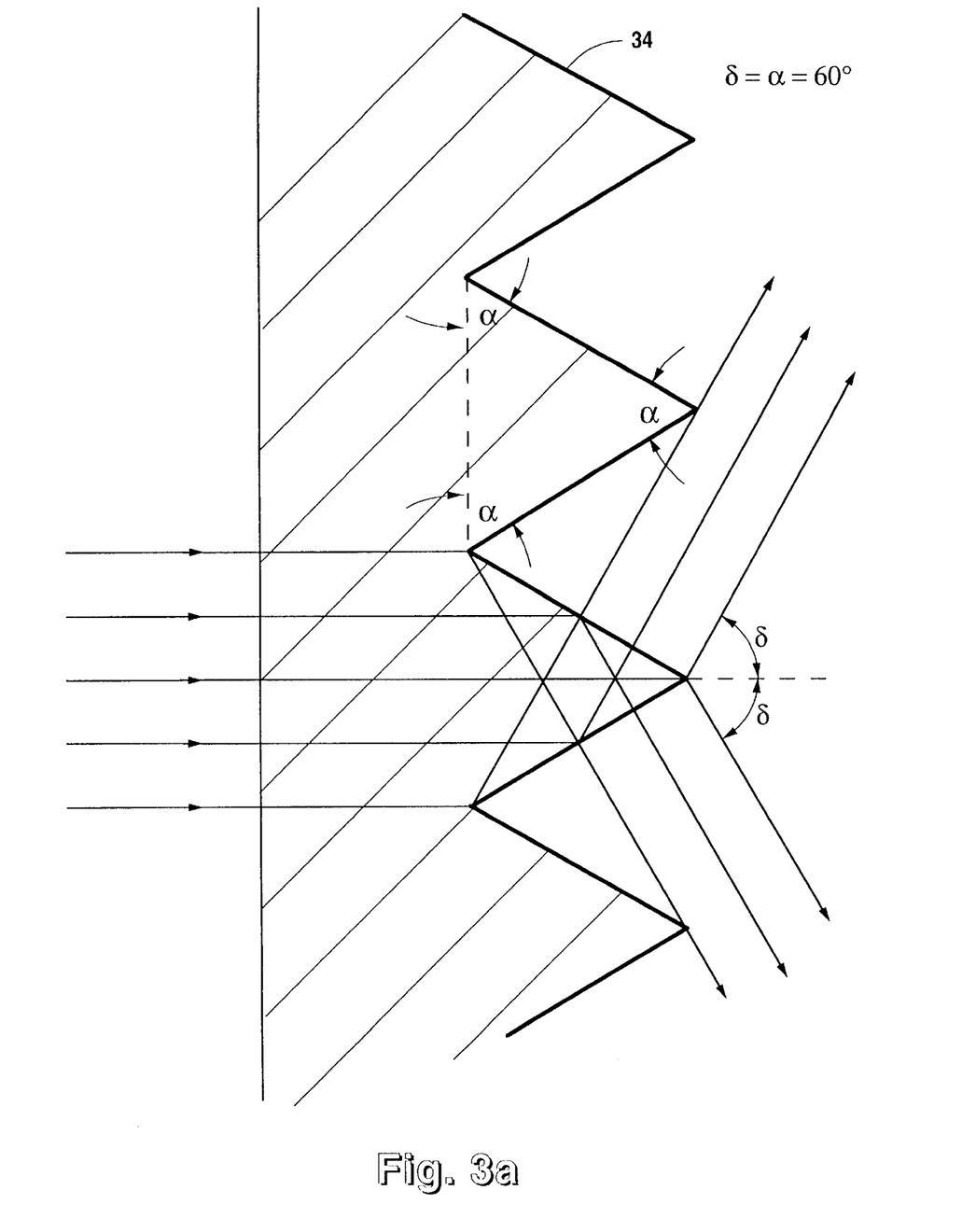
FIG. 3a is an enlargement of the linear microprismatic element structure on the spatial integrator of FIG. 3.

FIG. 3 shows spatial integrator cell 22. Each adjacent entrance beam is equally deviated by the first microprismatic element 32, which consists of a series of 60° equilateral linear microprisms 34 (see FIG. 3a). Half of the light passes directly to a second, oppositely disposed microprismatic element 36. The other half of the light is reflected off side mirrors 38 and 40, where it then passes to the opposite microprismatic element 36. By controlling the length of cell 22, both beams exit the cell as a spatially integrated and collimated beam. The spatial integrator cell length L=A tan($\pi/6$), where A is the half-height of the cell (see FIG. 5), and light rays entering the center of cell 22 exit at the edge of the cell. FIG. 3a shows an enlarged section of first linear microprismatic element 32, where all the prism angles $\alpha=60°$, and the deviation angle $\delta=60°$. There is no refraction, hence no chromatic dispersion, at either microprismatic element since all ray deviations occur by total internal reflection (TIR), i.e., the angle of incidence at the interface between air and the microprismatic element is zero. For slight deviations from perfect collimation, there is substantially no chromatic dispersion for rays which are refracted at either surface, and also reflected from the TIR facets, since the microprisms are 60° equilateral triangles.

Figure 4:
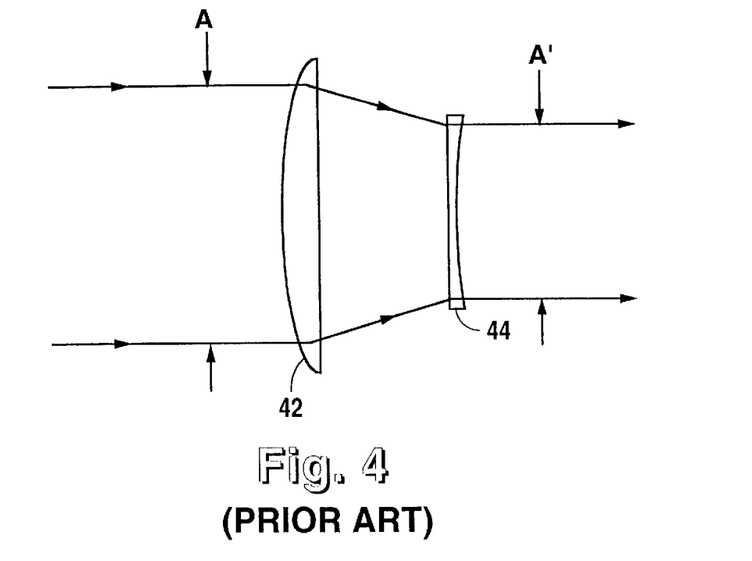
FIG. 4 is a diagram of one type of prior art aspect ratio converter using positive and negative cylinder lenses.
Figure 5:
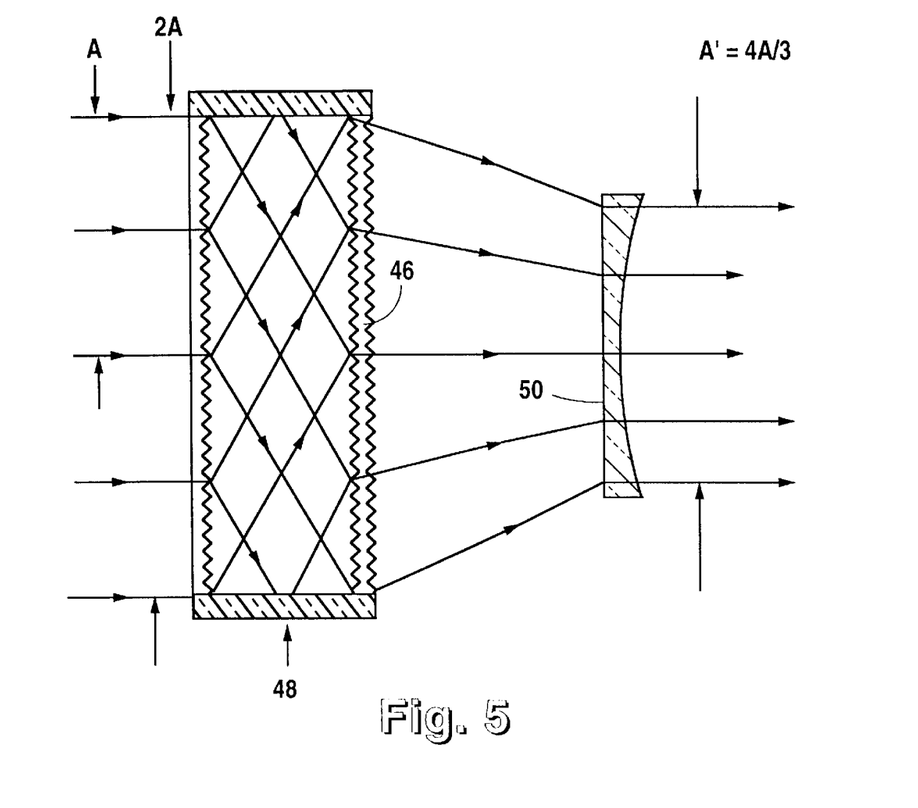
FIG. 5 is a diagram showing application of positive/negative cylinder Fresnel lenses to the current invention.

Since PBS cube 16 forms adjacent square beams, each having an aspect ratio AR=1:1, the polarization converted beam entering and exiting the spatial integrator cell has an AR=2:1. Since most LCD panels have an AR=4:3=1.33, the AR should be adjusted for efficient illumination of the LCD panel. One standard method of aspect ratio conversion that preserves the direction of the light beam is by the use of positive and negative cylinder lenses 42 and 44, respectively, as shown in FIG. 4. A novel variation of this method is used in the current invention by forming a positive cylinder Fresnel lens 46 in the exit surface of the spatial integrator cell 48, as shown in FIG. 5. The negative cylinder lens 50 can be continuous or of the Fresnel type.

Figure 6:
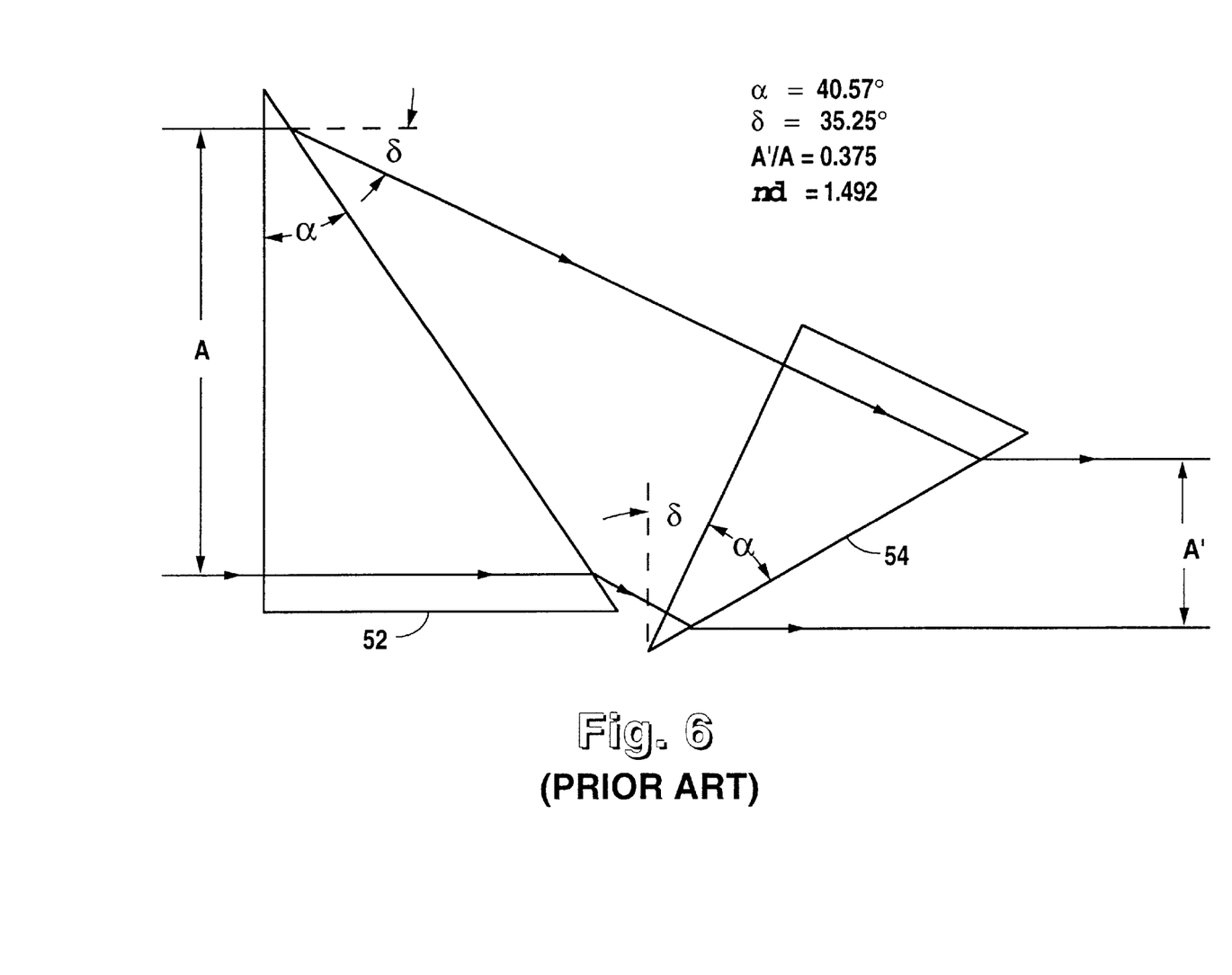
FIG. 6 shows prior art anamorphic beam compression using identical prism pair, with minimal chromatic dispersion.
Figure 7:
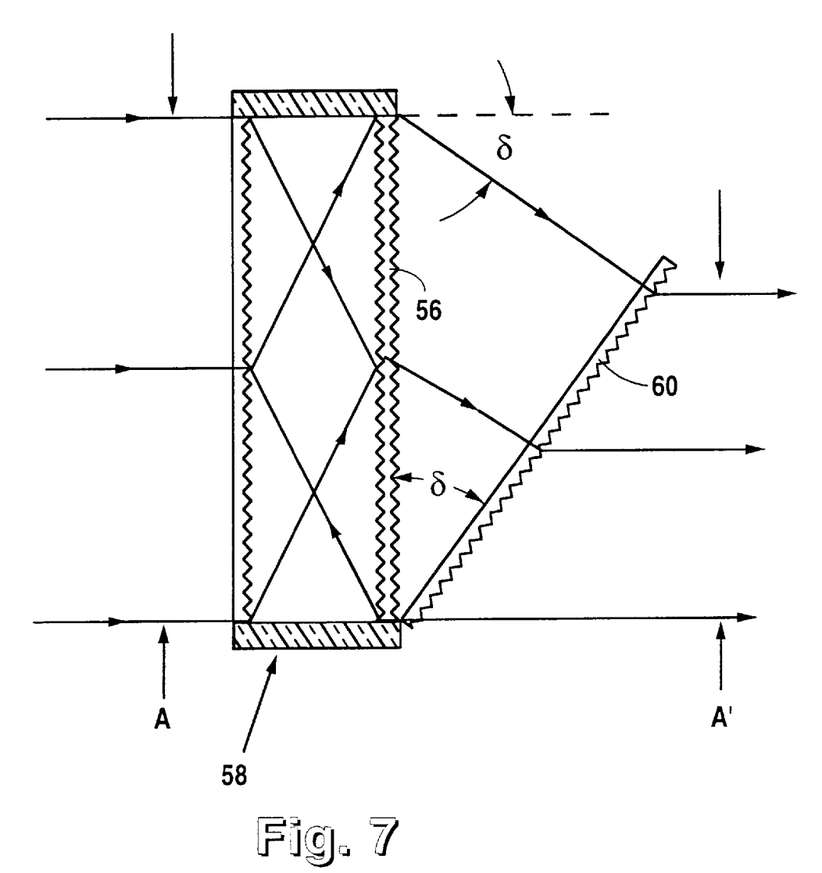
FIG. 7 is a diagram of a spatial integrator of the present invention with anamorphic beam compression using identical Fresnel prisms.

Another standard method of converting aspect ratio, or anamorphic beam compression, uses a pair of identical prisms as shown in FIG. 6. The chromatic dispersion of the first prism 52 is canceled by the opposite dispersion of the second prism 54, and the direction of the collimated light is preserved. A similar effect may be achieved in the current invention by forming the first element as a series of linear microprisms on the exit element 56 of a spatial integrator cell 58. A second linear microprismatic element 60 is then set at an oblique angle 6 equal to the ray deviation of the first element, as shown in FIG. 7. For example, for acrylic plastic ($n_d$=1.492) with prism angles $\alpha=40.52°$, and $\delta=35.25°$, the aspect ratio of the beam is converted from 2/1 to 4/3, with no chromatic dispersion.

Figure 8:
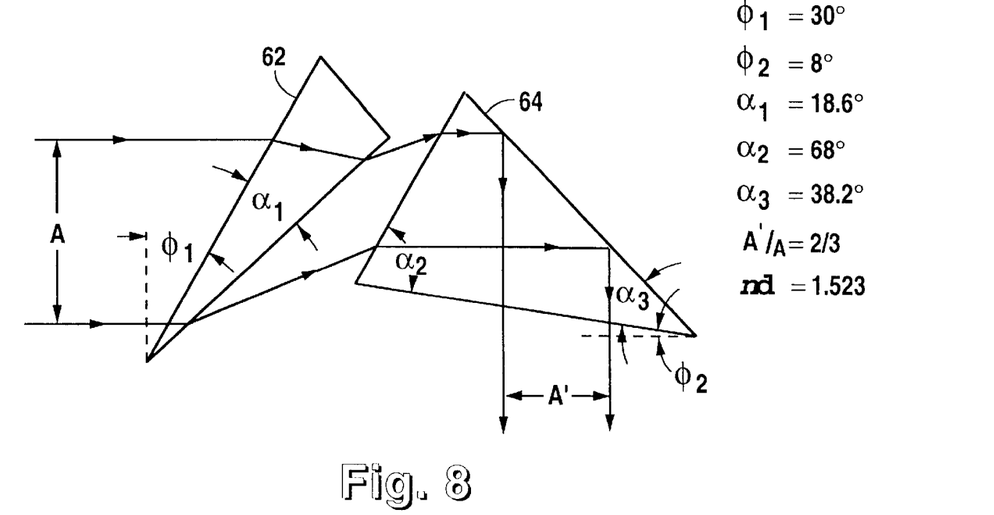
FIG. 8 is a diagram of anamorphic beam compression using a prismatic pair with 90° beam deviation and minimal chromatic dispersion.

It is also possible to perform anamorphic beam compression in conjunction with the present invention with a 90° beam deviation, by using two prisms as shown in FIG. 8. Here the first refracting prism 62 is followed by a second prism 64 that deviates the beam by refraction and total internal reflection. By specifying the vertex angles and tilt angles as shown, the chromatic dispersion of the first prism is canceled out by the dispersion of the second prism. For example, using optical crown glass ($n_d$=1.523) for both prisms, and $\phi_1$=30°, $\phi_2$=8°, $\alpha_1$=18.6°, $\alpha_2$=68°, $\alpha_3$=38.2°, then the beam is converted from an AR=2:1 to an AR=4:3 with negligble chromatic dispersion.

Figure 9:
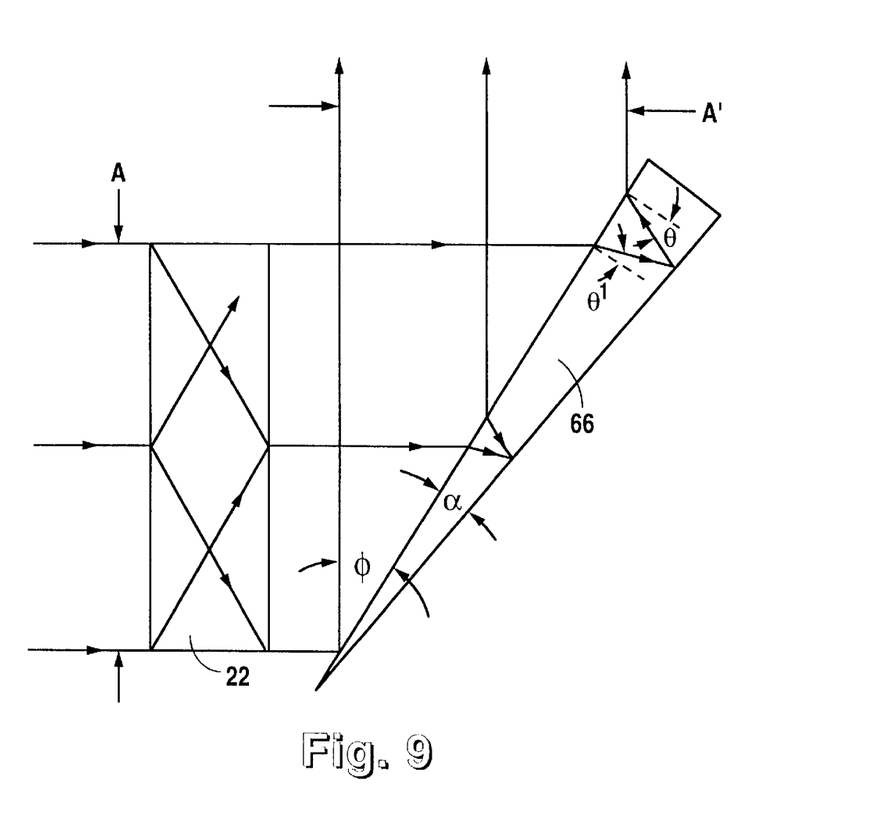
FIG. 9 shows a reflective wedge prism as an anamorphic beam compressor.

If a beam deviation of 90° is introduced between the spatial integrator and the LCD panel, there are several other methods of achieving the desired aspect ratio conversion. One method is shown in FIG. 9, which utilizes a reflective wedge prism 66. The incident beam, having an AR=2:1 is converted to an output beam with an AR=4:3 by specifying the tilt angle $\phi$ and the prism wedge angle $\alpha$. Here $$\phi \approx a\tan(A'/A),$$

and $$\alpha = (\theta - \theta')/2,$$

where: A'=width of compressed exit beam,

A=width of entrance beam, $\theta$=angle of incidence of exiting reflected ray at refracting surface, and $\theta'$=angle of refraction of entrance ray at refracting surface. The $\phi$ value shown is an approximation. In practice, it is necessary to account for the varying prism thickness and its effect on the compression of the exit beam. Thus $\phi$ and $\alpha$ are iteratively adjusted until the exit beam is compressed to achieve the desired aspect ratio. For a reflecting wedge prism 66 of optical crown glass ($n_d$=1.523), $\phi \approx 17.0°$, and $\alpha \approx 13.9°$, a beam compression ratio A'/A=0.375 can be obtained.

Figure 10:
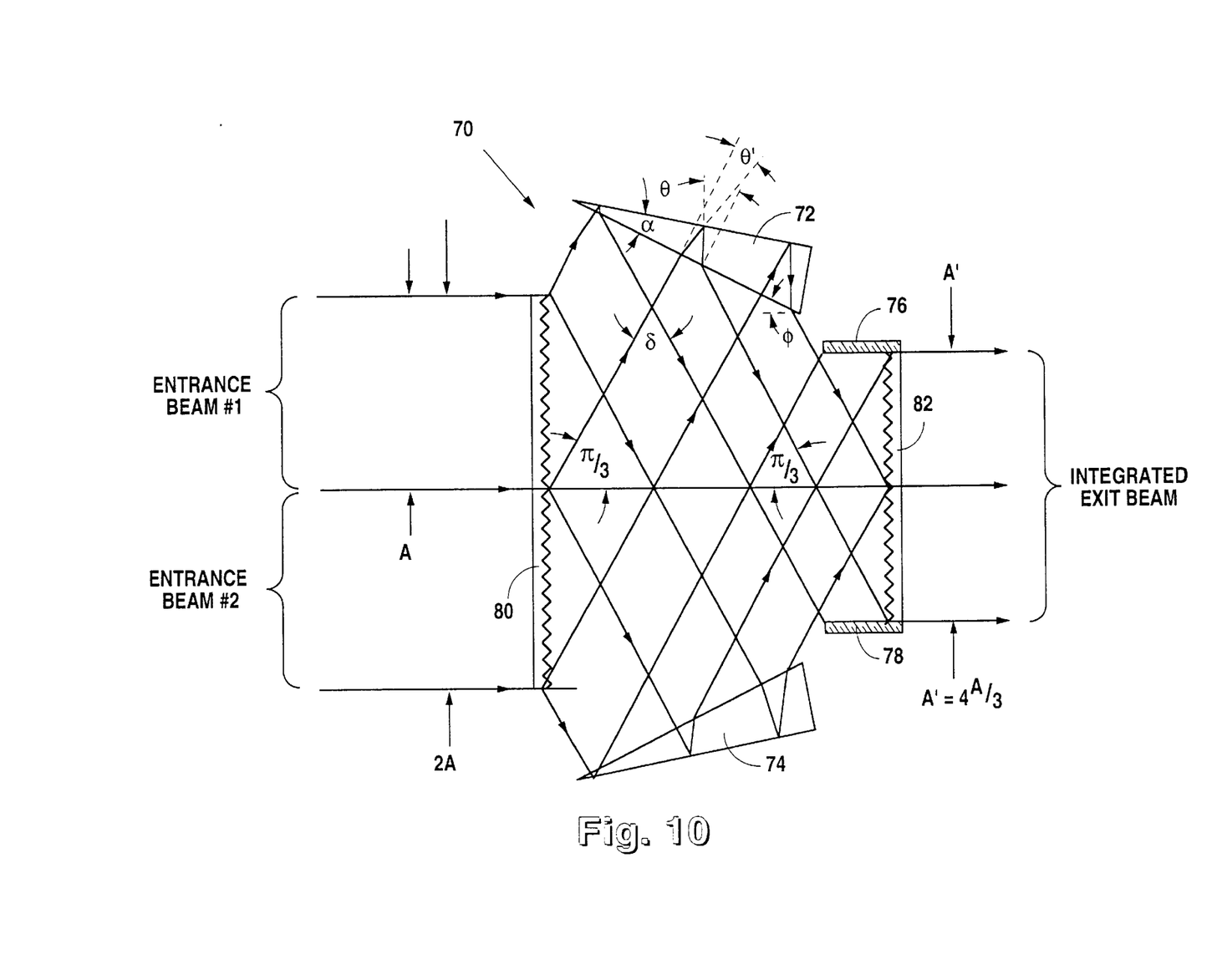
FIG. 10 shows a combined spatial integrator/anamorphic beam compressor.

FIG. 10 shows a spatial integrator 70 where anamorphic beam compression and spatial integration of dual incoming beams has been performed using reflecting wedge prisms 72 and 74, and auxiliary planar side mirrors 76 and 78. The prism deviation angle $\delta$ is 60°, and the entrance angle for the 60° linear microprismatic elements 80 and 82 is 60°. For the figure shown:

$$A' = (4/3)A,$$

$$\phi \approx a\tan((\cos(\pi/6)-C\cos(\pi/3))/(C\cos(\pi/3)+\cos(\pi/6))),$$

and $$\alpha = (\theta - \theta')/2,$$

where: C=anamorphic compression factor of wedge prism, $\theta$=angle of incidence of exiting reflected ray at refracting surface of wedge prism, $\theta'$=angle of refraction of entrance ray at refracting surface of wedge prism, and $\phi$=tilt angle of the wedge prisms.

Figure 11:
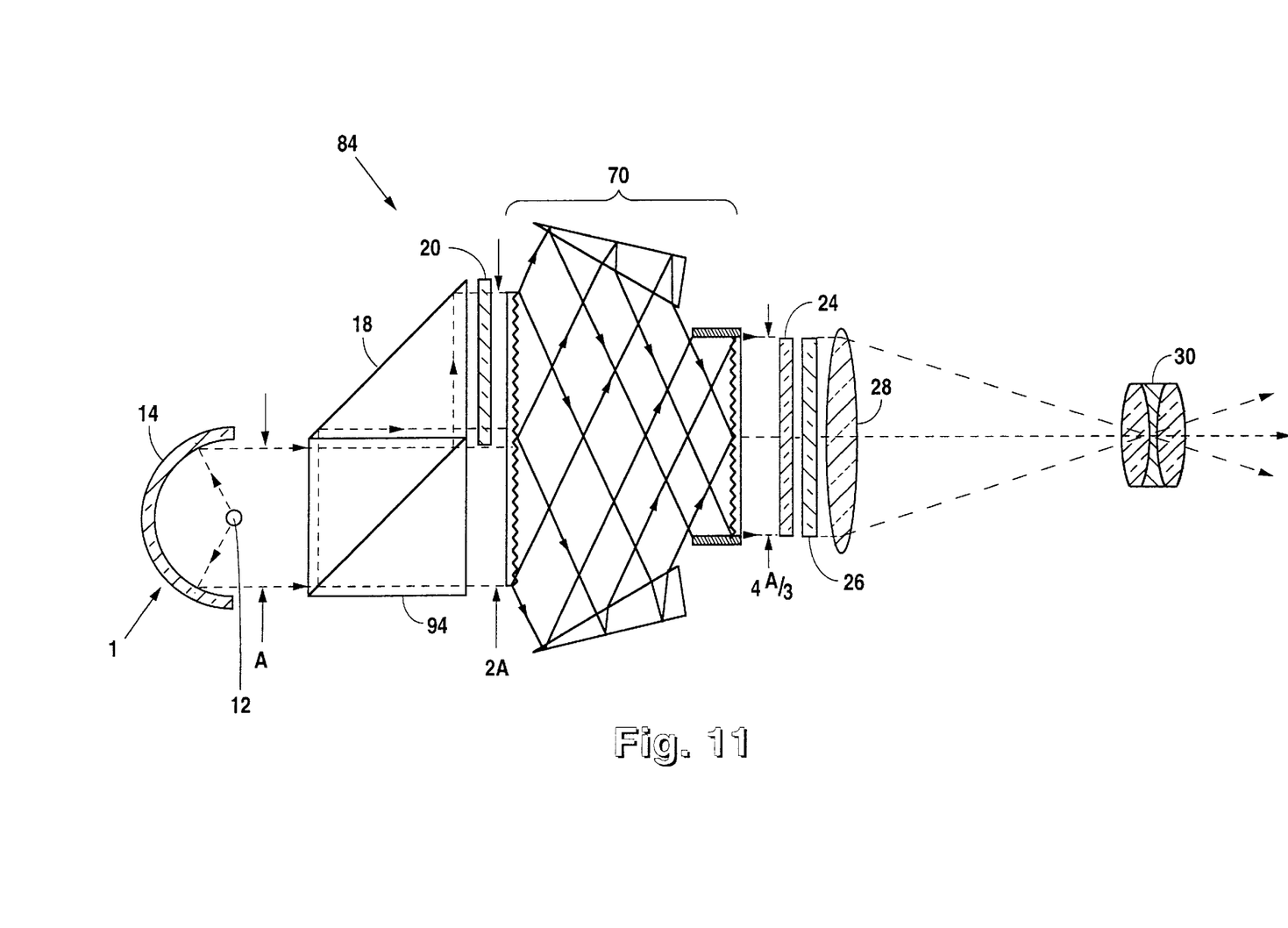
FIG. 11 shows an LCD projector using an embodiment of the current invention.

For C=2/3, two adjacent collimated entrance beams of the same polarization, each of cross-section A×A, are combined into an integrated, collimated and polarized exit beam of cross-section 4A/3×A, having an aspect ratio AR=4:3, Each reflecting wedge prism has refractive index $n_d$=1.523, $\phi$=26.0°, and $\alpha$=15.2°. In the system of FIG. 10, the reflecting surfaces of the wedge prisms are generally opposed, but not parallel. FIG. 11 shows a compact LCD illumination and projection system 84 using this combined spatial integrator and anamorphic beam compressor.

Figure 12:
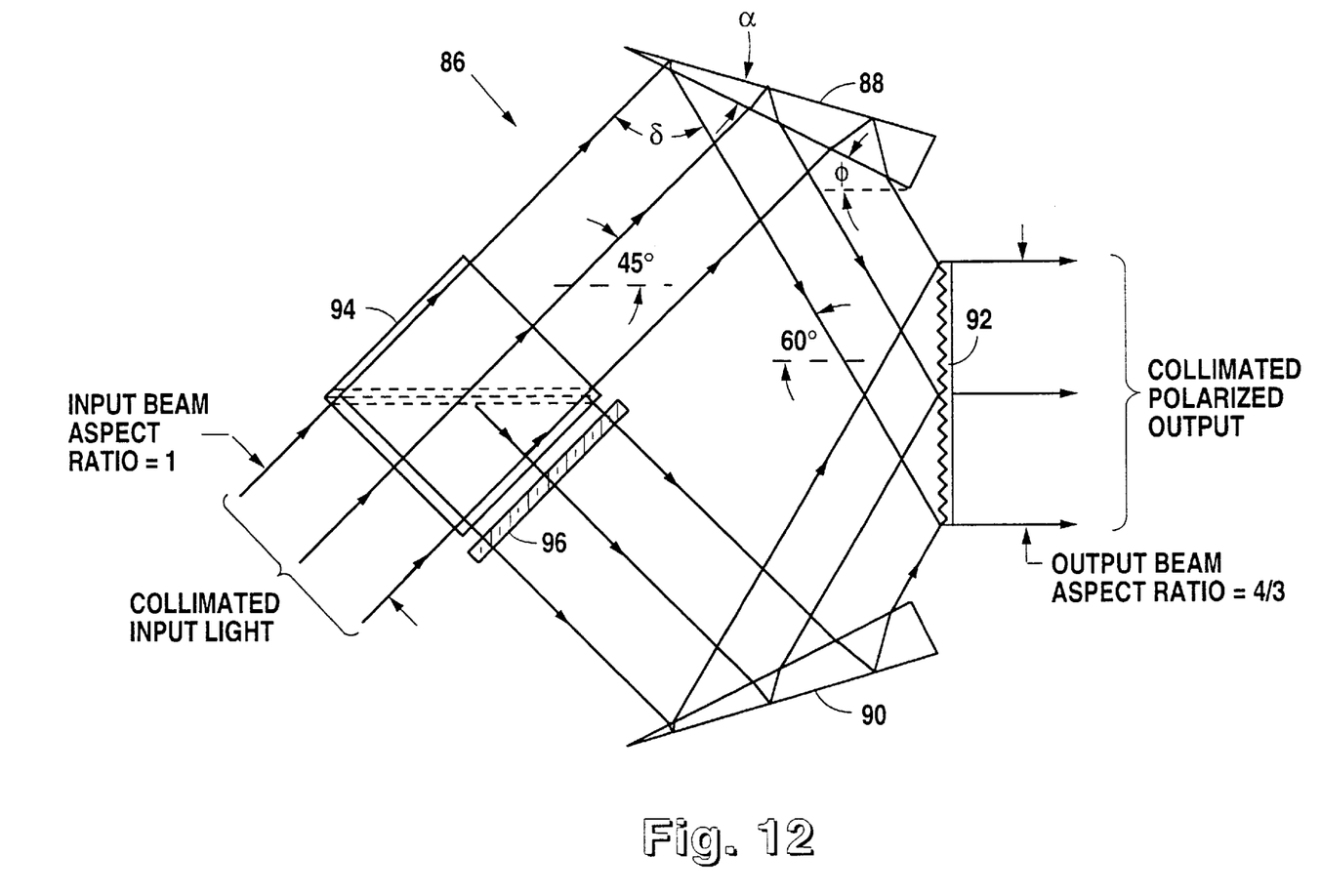
FIG. 12 shows another embodiment of the current invention which eliminates the need for a right angle prism in conjunction with the PBS cube.

FIG. 12 shows a polarization converter 86 that uses two reflecting prisms 88 and 90 and a single 60° microprismatic element 92 to spatially integrate the two beams and convert the aspect ratio. Collimated light enters a polarization beam splitter 94 where the p-polarized light is transmitted and s-polarized light is reflected and converted to p-polarized light by the half-wave retarder 96. The two beams enter reflecting prisms at a 45° entrance angle, are compressed by a factor C, and exit the prisms at an angle of 60°. There is a 75° deviation angle $\delta$ between the input and exit beams of the reflecting prism. The compressed beams are then spatially integrated into a single collimated polarized beam by the 60° microprismatic element. An incoming beam having an aspect ratio AR=1 can be converted to an outgoing beam having an aspect ratio AR=4:3 by the use of reflecting prisms having a refractive index $n_d$=1.523, a vertex angle $\alpha$=10.3°, a tilt angle $\phi$=26°, and an anamorphic compression factor C=2/3.

EXAMPLE

A single panel LCD projection system was constructed as an optical breadboard to evaluate components of the current invention. A 24 volt, 250 watt tungsten-halogen lamp (EHJ type) having a spherical back reflector, produced a beam of collimated light of ≈50 mm diameter by means of a pair of glass condensing lenses. The beam was masked down to a 32 mm by 32 mm square aperture, and a piece of heat reflecting glass was positioned near this square aperture.

A broadband 450–680 nm PBS cube (Melles Griot #03 PBB 007) produced a transmitted p-polarized beam and a reflected s-polarized beam. A 45° uncoated prism (Edmund Scientific #32531) deviated the reflected beam 90° by total internal reflection to be adjacent to the transmitted beam. The s-polarized beam was converted to a p-polarized beam by a half-wave retarder sheet (Polaroid #605208). A spatial integrator cell was constructed using two linear 60° microprism elements, each element 32 mm wide by 64 mm high, of 2 mm thick acrylic, with each microprism width=0.25 mm. The separation of the microprism elements was L=18.5 mm. Spatial integration and common polarization of the two beams was verified by examining the output from the spatial integrator cell.

An anamorphic beam-compressing reflecting wedge prism was constructed from acrylic plastic ($n_d$=1.492), having a length of 100 mm, a width of 38 mm, and a wedge angle=14.3°. The reflecting wedge prism changed the beam dimension exiting the spatial integrator from 64 mm by 32 mm (AR=2:1) to 32 mm by 24 mm (AR=4:3).

A VGA compatible 1.3" diagonal monochrome LCD module (Seiko Epson #P13VM115/125), with an analyzer on the exit side, was illuminated by the collimated and polarized light beam exiting the wedge prism. A piano-convex field lens focused the light from the LCD module into a 3" focal length, f/2.5 coated anastigmat projection lens (JML Optical Industries). Using a Spectra-Physics brightness spot meter, measured brightness increase of the projected screen image was ≈70%, when the output of the converted polarized light was added to the primary beam.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. An article for spatially integrating at least two parallel and collimated entrance light beams, each entrance light beam including a plurality of light rays, the article comprising:
   a first reflecting surface;
   a second reflecting surface generally opposed to said first reflecting surface;
   means for deviating a plurality of the light rays from the at least two parallel and collimated entrance light beams onto said first and second reflecting surfaces, wherein the first and second reflecting surfaces reflect the deviated plurality of the light rays;
   means for collecting the deviated plurality of the light rays reflected by the first and second reflecting surfaces, and collimating and spatially integrating the collected light rays into a single exit beam; wherein said means for deviating a plurality of the light rays comprises a first microprismatic element having a planar first surface facing the at least two entrance light beams and a second surface including a plurality of prismatic grooves opposite said planar first surface;
   wherein said means for collecting the deviated plurality of the light rays comprises a second microprismatic element having a first surface of prismatic grooves facing the deviated plurality of light rays, and a planar surface opposite said first surface.

2. The article of claim 1, wherein said first and second microprismatic elements cause substantially no chromatic dispersion.

3. The article of claim 1 wherein said prismatic grooves of both said first and second microprismatic elements have prism having approximately 60° angles.

4. A spatial integrator for integrating at least two spatially separated collimated entrance light beams, each entrance light beam including a plurality of light rays, the spatial integrator comprising:
   a first reflecting surface;
   a second reflecting surface generally opposed to said first reflecting surface;
   a first microprismatic element;
   a second microprismatic element;
   wherein the first microprismatic element includes a surface having a first plurality of prismatic grooves, wherein the first plurality of prismatic grooves deviate a plurality of the light rays from the entrance light beams onto said first and second reflecting surfaces;
   wherein the first and second reflecting surfaces reflect the plurality of the light rays onto the second microprismatic element; and
   wherein said second microprismatic element includes a surface having a second plurality of prismatic grooves arranged to collect the plurality of the light rays reflected by the first and second reflecting surfaces, and collimates and spatially integrates the collected light rays into a single exit beam.

5. The spatial integrator of claim 4, wherein the first reflecting surface is generally parallel to the second reflecting surface and the first microprismatic element is generally parallel to the second microprismatic element.

6. The spatial integrator of claim 4, wherein the first reflecting surface, the second reflecting surface, the first microprismatic element, and the second microprismatic element together form a cell having a cell length L and a half-height A, wherein $L = A \tan(\pi 6)$.

7. The spatial integrator of claim 4, wherein said first microprismatic element comprises a planar first surface and a prismatic second surface having the first plurality of prismatic grooves.

8. The spatial integrator of claim 4, wherein said second microprismatic element comprises a prismatic first surface having the second plurality of prismatic grooves and a planar second surface.

9. The spatial integrator of claim 4, wherein said first and second microprismatic elements cause substantially no chromatic dispersion.

10. The spatial integrator of claim 4, wherein
    said first mnicroprismatic element comprises a planar first surface and a prismatic second surface having a first plurality of prismatic grooves; and
    said second microprismatic element comprises a prismatic first surface having, the second plurality of prismatic grooves and a planar second surface,
    and wherein the first and second pluralities of prismatic grooves of both said first and second microprismatic elements include prisms having approximately 60° angles.

11. The spatial integrator of claim 4, wherein the exit beam is parallel and collinear to the entrance light beams.

12. A projection system including the spatial integrator of claim 4 and a polarizing beam splitter, wherein the polarizing beam splitter splits a source light beam into the incident light beams.

13. The spatial integrator of claim 4, wherein the first plurality of prismatic grooves deviates a second plurality of the light rays from the entrance light beams onto the second microprismatic element and the second microprismatic element collimates and spatially integrates the second plurality of light rays into the single exit beam.

* * * * *